(12) United States Patent
Meixner

(10) Patent No.: US 10,124,670 B2
(45) Date of Patent: Nov. 13, 2018

(54) GEARBOX UNIT FOR A MOTOR VEHICLE

(71) Applicant: AUDI AG, Ingolstadt (DE)

(72) Inventor: Christian Meixner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 90 days.

(21) Appl. No.: 15/319,559

(22) PCT Filed: Jun. 9, 2015

(86) PCT No.: PCT/EP2015/001152
§ 371 (c)(1),
(2) Date: Dec. 16, 2016

(87) PCT Pub. No.: WO2015/192947
PCT Pub. Date: Dec. 23, 2015

(65) Prior Publication Data
US 2017/0129333 A1  May 11, 2017

(30) Foreign Application Priority Data

Jun. 17, 2014 (DE) .................. 10 2014 009 556
Sep. 13, 2014 (DE) .................. 10 2014 013 574

(51) Int. Cl.
*B60K 17/346* (2006.01)
*B60K 17/16* (2006.01)
(Continued)

(52) U.S. Cl.
CPC .......... *B60K 17/3462* (2013.01); *B60K 17/16* (2013.01); *F16H 48/05* (2013.01);
(Continued)

(58) Field of Classification Search
CPC ................................. B60K 17/3467
See application file for complete search history.

(56) References Cited

U.S. PATENT DOCUMENTS 3,053,404 A  9/1962 Beck et al.
4,747,643 A * 5/1988 Lanzer .............. B60T 8/26
180/233

(Continued)

FOREIGN PATENT DOCUMENTS

DE  10 2012 021 513 A1  5/2014
JP  S62227821 A  10/1987
WO  91/06787 A1  5/1991

OTHER PUBLICATIONS

International Preliminary Report on Patentability dated Aug. 22, 2016 in corresponding Application No. PCT/EP2015/001152; 25 pgs.

(Continued)

*Primary Examiner* — Tisha D Lewis
(74) *Attorney, Agent, or Firm* — Maier & Maier, PLLC

(57) ABSTRACT

A gearbox unit for a motor vehicle, wherein the motor vehicle has a first and a second wheeled axle, the second wheeled axle including a first sub-axle and a second sub-axle. The gearbox assembly of the motor vehicle may include a first connecting shaft operatively connectable to the first sub-axle, a second connecting shaft operatively connectable to the second sub-axle, and a coupling gearbox, which has a drive input shaft operatively connectable to a drive assembly of the motor vehicle and which has a drive output shaft operatively connectable to the first wheeled axle. The drive input shaft may be operatively connected in torque-splitting fashion to the first and the second connecting shaft. The drive output shaft may be operatively connectable to the first connecting shaft so as to be switchable by a first clutch and to the second connecting shaft so as to be switchable by a second clutch.

19 Claims, 3 Drawing Sheets

(51) Int. Cl.
  *F16H 48/05* (2012.01)
  *F16H 48/10* (2012.01)
(52) U.S. Cl.
  CPC ..... *F16H 48/10* (2013.01); *F16H 2200/0017* (2013.01); *F16H 2200/0034* (2013.01); *F16H 2200/201* (2013.01); *F16H 2200/2035* (2013.01)

(56) References Cited

U.S. PATENT DOCUMENTS

| | | | | |
|---|---|---|---|---|
| 4,819,512 | A * | 4/1989 | Azuma | B60K 17/20 180/248 |
| 5,080,187 | A * | 1/1992 | Asano | B60K 17/3505 180/233 |
| 5,127,887 | A | 7/1992 | Nuttall | |
| 5,282,518 | A * | 2/1994 | Yamasaki | B60K 17/35 180/233 |
| 5,492,189 | A | 2/1996 | Kriegler et al. | |
| 6,251,037 | B1 | 6/2001 | Baumgaertner et al. | |
| 7,628,241 | B2 * | 12/2009 | Miura | B60W 10/04 180/197 |
| 7,806,219 | B2 * | 10/2010 | Oberhausen | B60K 17/16 180/245 |
| 9,902,261 | B2 * | 2/2018 | Meixner | B60K 17/346 |
| 2008/0242498 | A1 | 10/2008 | Miller et al. | |
| 2010/0170737 | A1 * | 7/2010 | Meissner | B60K 23/04 180/248 |
| 2011/0035090 | A1 * | 2/2011 | Noguchi | B60W 10/119 701/31.4 |

OTHER PUBLICATIONS

International Search Report dated Aug. 24, 2015 in corresponding Application No. PCT/EP2015/001152; 11 pgs.

Notification of Transmittal of Translation of the International Preliminary Report on Patentability (Chapter I or Chapter II) dated Dec. 22, 2016, in connection with corresponding international Application No. PCT/EP2015/001152 (6 pgs.).

German Office Action dated Aug. 7, 2017, in connection with corresponding DE Application No. 10 2014 013 574.8 (10 pgs.).

Chinese Office Action dated Apr. 2, 2018, in connection with corresponding Chinese Application No. 201580032023.3 (6 pgs.).

* cited by examiner

GEARBOX UNIT FOR A MOTOR VEHICLE

BACKGROUND

The invention relates to a transmission device for a motor vehicle having the features of the preamble of claim 1, wherein the motor vehicle has a first wheel axis and a second wheel axis, the second wheel axis consisting of at least a first partial axis and a second partial axis.

Such a transmission is used for example to transmit a torque between a drive unit of the motor vehicle and at least two wheel axles of the motor vehicle. In this manner, both the first wheel axle and the second wheel axle are connected to the drive unit via the transmission device. They are therefore driven wheel axles, so that the motor vehicle is thus provided as an all-wheel drive motor vehicle. The first wheel axle is in this case for example a front axle of the motor vehicle, while the second wheel axle represents the rear axle of the motor vehicle. However, it is also possible to provide the opposite configuration.

With transmission device devices of the type mentioned above, for example a connecting shaft can be provided to transmit the torque to the second wheel axle, wherein the connecting shaft is designed in particular as a Cardan shaft. In order to achieve good driving characteristics, a differential must be usually assigned to the second wheel axle, which is connected to the connecting shaft and ensures distribution of the torque supplied by the transmission device to the first sub-axle and the second sub-axle. The differential is therefore provided in an operative connection between the connecting shaft and the second wheel axle. However, the differential consumes a large amount of space.

SUMMARY OF THE DISCLOSURE

The object of the invention is to provide a transmission device that has advantages over the known transmission devices, in particular because it enables a compact design of the second wheel axle, wherein preferably no differential is present, in particular because no differential is present between the connecting axle and the second wheel axle.

This is achieved in accordance with the invention with a transmission device having the features of claim 1. In this case, a first connecting shaft that is operatively connectable to the first sub-axle is provided, as well as a second connecting shaft that is operatively connectable to the second sub-axle, and a coupling transmission that has an operative connection to the drive unit of the vehicle and that is provided with a drive shaft is operatively connectable to a first wheel axle, wherein the drive shaft is operatively connected through the coupling transmission to the first connecting shaft and the second connecting shaft for torque distribution, the drive shaft is operatively connected by means of a first clutch in a switchable manner to the first connecting shaft, and by means of a second clutch it is connected in a switchable manner with the second connecting shaft, wherein the first connecting shaft and a first superposition gear are provided between the first clutch and the second connecting shaft, and a second superposition gear is provided between the second clutch and the second connecting shaft.

Torque transmission from the transmission device in the direction of the second wheel axle is therefore not carried out as usual only by means of a connecting shaft or a Cardan shaft, but it is carried out instead with at least two connecting shafts, in particular with the first and the second connecting shaft. The first connecting shaft in this case is coupled or can be coupled with the first sub-axle of the second wheel axle. The second connecting shaft, on the other hand, can be coupled or is coupled with the second sub-axle of the second wheel axle. Since the torque transmission to both sub-axles takes place separately via both connecting axles, an axle differential that would be otherwise required, which would be assigned to the second wheel axle, is integrated in the coupling gear. For example, the coupling gear is equipped only with an axle differential. However, the coupling gear can be also provided as a double differential, which integrates both a center differential and an axle differential in one structural unit. Accordingly, a space-saving arrangement of the second wheel axle is possible.

The invention relates of course also to a vehicle having a transmission device, which is preferably designed in the manner described above. The motor vehicle is equipped with the first wheel axle and with the second wheel axle, wherein the second axle consists of at least the first sub-axle and the second sub-axle. The motor vehicle is characterized by a connecting shaft that is operatively connected with the first sub-axle, by a second shaft connecting shaft operatively connected with the second sub-axle, as well as with an input shaft operatively connected through a coupling gear with an input unit, and with an output shaft operatively connected with the first wheel axle, wherein the input shaft is operatively connected in a torque distributing manner through the coupling gear with first and the second connecting shaft, and wherein the output shaft can be operatively connected by means of the first clutch in a switchable manner with the first connecting shaft, wherein a first superposition gear is provided between the first clutch and the first connecting shaft, and a second superposition gear is provided between the second clutch and the second connecting shaft. The motor vehicle is for example further developed with the transmission device of the vehicle according to the present description.

The operative connection via the coupling gear is distributing the torque. This means that one part of the torque provided through the input shaft is provided to the first connecting shaft and another part will be provided to the second connecting shaft. An equal distribution, but also an unequal distribution, can thus be achieved between the first connecting shaft and the second connecting shaft. Both the first connecting shaft and the second connecting shaft are preferably designed as Cardan shafts.

In addition to the coupling transmission, the first superposition gear and the second superposition gear are also provided. An operative connection can be produced through the superposition gears between the output shaft and the corresponding connecting shaft. The first coupling transmission and the second coupling transmission are provided for this purpose. Therefore, while the input shaft is operatively connected through the coupling gear with the first connecting shaft and the second connecting drive, preferably in a rigid manner and permanently, the output shaft can be connected via the first clutch to the first connecting shaft and by means of the second clutch to the second connecting shaft. In the coupling connection between the first connecting shaft and the output shaft is thus arranged the first superposition gear and in the coupling connection between the second connecting shaft and the output shaft is arranged the second superposition gear. Therefore, this means that the torque can be transmitted through the first clutch and the first superposition gear, and the transmission can be also transmitted from the second connecting shaft through the second clutch and the second superposition gear in each case selectively to the output shaft.

For example, in a first switching state of the first clutch, the output shaft is decoupled from the first connecting shaft, and the same applies also to the second connecting shaft in a first switching state of the second clutch. In a second switching state of the first clutch, the output shaft is in an operative connection through the first superposition gear with the first connecting shaft; analogously to this function functions also the second connecting shaft in a second connecting state of the second clutch. The superposition gears in this case have a certain transmission ratio, which is for example fixed. For example, the transmission ratio of the first superposition gear is identical to that of the second superposition gear. However, the transmission ratios are preferably different from each other. It is of course also possible to alternatively design the first superposition gear and/or the second superposition gear also as manual transmissions and to this extent provide an adjustable transmission.

It should be pointed out that both superposition gear are different from the coupling gears. The operative connection created between the respective connecting shifts and the drive shift is not provided, at least not completely, through the coupling gear. By using the superposition gear, it is possible in particular when negotiating curves with the vehicle to transfer a torque from the first sub-axle of the second wheel axle to the first wheel axle. This means in particular that the torque can be transmitted both from a rear wheel outside the curve and from a rear wheel inside the curve, wherein a lower torque is preferably withdrawn from the rear wheel outside the curve than that from the rear wheel inside the curve. By and large, it is thus possible to create "torque vectoring" by using the superposition gear in many driving states of the motor vehicle, preferably in each driving state of the motor vehicle, which is to say a targeted transmission of the torque to a certain wheel axle, in particular from one or both sub-axles of the second wheel axle. Each of the superposition gears can be realized for example as a negative planetary gear or as a positive planetary gear.

For example, the coupling gear is provided as a planetary gear, wherein the drive shaft as well as the first connecting shaft and the second connecting shaft are in a direct operative connection with the coupling gear. The coupling gear now represents an axle differential for the second wheel axle. This will be therefore integrated from an installation location in the region of the second wheel axle in the gear device, which replaces for example a center differential of the motor vehicle. The drive shaft as well as both connecting shafts are in a direct operative connection with the coupling gear. Under the term direct operative connection should be understood the mentioned shafts that are in each case coupled with an element of the coupling gear, so that the an operative connection does not take place over one of the superposition gears.

A further embodiment of the invention provides the first superposition gear and the second superposition gear can be also designed as planetary gears that are operatively connected directly with the coupling gear. In each case, one wheel of both superposition gears is thus connected to one wheel of the coupling gear, or operatively connected to it, in particular rigidly and/or permanently. For example, an operative connection is initially provided directly between the coupling gear and the first connecting shaft on the one hand, as well as between the coupling gear and the second connecting shaft on the other hand. This means that the corresponding connecting shaft is directly connected to the coupling gear, which is to say preferably rigidly and/or permanently operatively connected with one wheel of the coupling gear. In addition or as an alternative, it is also possible to provide an arrangement in which the above mentioned operative connections are provided through corresponding superposition gears. This will then mean that an operative connection between the coupling gear and the first connecting shaft is provided via the first superposition gear, and/or an operative connection between the coupling gear and the second connecting shaft is provided via the second superposition gear.

According to a preferred embodiment of the invention, the output shaft can be operatively connected to the first transmission gear and through the second clutch to the second superposition gear. The clutches are provided on the side assigned to the output gear of the superposition gear.

With a fully opened first clutch or with a fully opened second clutch, the first superposition gear or the second superposition gear will be fully decoupled from the output shaft. At the same time, it is also possible that the first superposition gear is operatively connected, preferably rigidly and/or permanently, to the first connecting shaft, and the second superposition gear is operatively connected, preferably rigidly and/per permanently, to the second connecting shaft.

According to another embodiment of the invention, the coupling gear is a coupling gear wheel, a coupling gear ring gear and a coupling gear planetary carrier equipped with at least one coupling gear sun gear and a coupling gear planet wheel meshing with the coupling gear ring wheel, wherein the coupling gear ring wheel is in direct operative connection with the drive shaft. The coupling gear is thus provided as a planetary gear and it is therefore equipped with the corresponding elements or wheels. It is preferred when the drive shaft is rigidly and/or permanently connected with the coupling gear ring wheel. However, it goes without saying that another embodiment can be also provided.

In another preferred embodiment of the invention, the coupling planetary gear carrier is operatively connected with the first connecting shaft and the coupling gear sun gear is operatively connected with the second connecting shaft, or the coupling gear planetary carrier is operatively connected with the second connecting shaft and the coupling gear sun wheel is directly operatively connected with the first connecting shaft. Two different design possibilities are thus available for the gear device. The coupling gear planetary carrier can either be operatively connected with the first connecting shaft or with the second connecting shaft and the coupling gear sun wheel can be directly operatively connected with another shaft, preferably rigidly and/or permanently. Under direct operational connection should be again understood an operational connection, which preferably is not realized through one or several gears, which is to say a coupling gear, the first superimposition gear and or the second superimposition gear.

In a further development of the invention, the coupling gear planetary carrier is provided with at least one outer planetary wheel and at least one inner planetary wheel, which are mutually meshing, wherein the outer planetary wheel is meshing with the coupling gear ring wheel and the inner planetary gear is meshing with the coupling gear sun wheel. The coupling gear is thus constructed as a double planetary gear. Accordingly, both the outer planetary wheel and the inner planetary wheel are provided, through which the coupling gear ring wheel and the coupling gear sun wheel are operatively connected. Both the outer planetary gear and the inner planetary wheel are rotatably arranged or mounted on the coupling gear planetary carrier. They mutually mesh with each other, while at the same time, the outer planetary wheel engages the coupling gear ring wheel and the inner planetary wheel engages the coupling gear sun wheel. The outer planetary wheel and the inner planetary wheel can be arranged at a different radial position with respect to the rotational axis of the coupling planetary carrier.

In another embodiment of the invention, the first superposition gear is equipped with a first primary gear and with a first secondary gear, wherein the first primary gear is equipped with a first primary gear sun wheel and a first primary gear planetary carrier having at least a first primary gear planet wheel mashing with the first primary gear sun wheel, wherein the first primary gear song wheel is directly operatively connected with the first connecting shaft. The first superposition gear thus consists of two mutually coupled planet gears, in particular the first primary gear and the first secondary gear. Both are respectively provided with a sun wheel and with a planetary carrier, which can be described in the case of the first primary gear as a first primary gear sun wheel and as a first primary gear planetary carrier, and in the case of the secondary gear as a first secondary gear sun wheel and as a first secondary gear planetary carrier. The first connecting shaft is directly connected with an operative connection to the first primary gear sun wheel, in particular rigidly and/or permanently. Analogously, the coupling gear planetary carrier is operatively connected to the first primary carrier planetary carrier, preferably with a rigid and/or permanent operational connection.

In another embodiment of the invention, the first secondary gear is provided with a first secondary gear sun wheel and a first secondary gear planetary carrier having at least one secondary gear primary planet wheel mashing with the first secondary gear sun wheel, wherein the first secondary gear sun wheel can be fixed by means of the first clutch with respect to the output shaft, at least partially, in particular fully, and the first secondary gear planetary carrier is directly operatively connected with the clutch gear planetary carrier. The embodiment of the first secondary gear has been in particular pointed out. The first secondary transmission planetary carrier is analogously to the first primary gear planetary carrier connected to the coupling gear planetary carrier, preferably with a rigid and/or permanent operative connection. This means at the same time that according to the embodiments above, the first primary gear planetary carrier and the second gear planetary carrier are also directly connected to one another with an operational connection. They are preferably designed as a joint planetary carrier. In another development, the coupling gear planetary carrier can be provided as a component part of a joint planetary carrier, so that in this respect, preferably only a single joint axis of rotation of the coupling gear planet wheel, of the first primary gear planetary wheel, and of the first secondary gear planet wheel, is provided.

It is preferred when the first primary gear planet wheel and the first secondary gear planetary carrier are connected to each other non-rotatably and when they are jointly mounted on the first primary gear planetary carrier with respect to the first secondary gear planetary carrier.

In addition or as an alternative, the second superposition gear is provided with a second primary gear and a second secondary gear, wherein the second primary gear is provided with a second primary gear sun wheel and the second primary gear planetary carrier is provided with a second primary gear planetary gear that is meshing with the second primary gear sun wheel, and wherein the second primary gear sun wheel is directly operatively connected with the coupling planetary carrier and the second primary gear planetary carrier is directly operatively connected with the first connecting shaft. The second superposition gear will then also consist of two planetary gears, in particular the second primary gear and the second secondary gear, which are operatively connected to one another. The planetary gears are provided with the usual components. To this end, the reference is made to the comments above regarding the first superposition gears, as the explanations can be applied in an analogous manner. It is now also preferably provided that the coupling gear planetary carrier is connected with the second primary gear sun wheel, in particular so that it is connected to it rigidly and/or permanently with an operative connection. In addition, the first connecting shaft should be operatively connected to the second primary gear planetary carrier, preferably so that it is connected to it rigidly and/or permanently.

Finally, it is also possible that the second secondary gear is provided with a second secondary gear sun wheel and a second secondary gear carrier having at least a second secondary gear planetary wheel meshing with the second secondary gear sun wheel, wherein the secondary gear sun wheel is operatively connected by means of the second clutch so that it can be fixed at least partially with respect to the output shaft, in particular so that it can be fully fixed, and the second secondary gear planetary carrier is directly connected with an operative connection to the second primary gear planetary carrier. The secondary gear planetary carrier is thus connected to the second primary gear planetary carrier, preferably so that it is connected to it with a rigid and/or permanent operative connection. This means that at the same time, it is also directly connected with an operative connection to the first connecting shaft. The output shaft can then be connected through the second clutch with the secondary gear sun wheel with a closed second clutch, and the output shaft is then fixed to the secondary gear sun wheel, at least partially, preferably fully. It is preferred when the second primary gear planetary wheel and the second secondary gear planetary wheel are mutually non-rotationally connected and jointly mounted on the second primary gear planetary carrier with respect to the second secondary gear planetary carrier.

In addition or as an alternative, the first connecting shaft can be connected through a first gear unit with the first sub-axle, and the second connecting shaft is connected through a second gear unit, in particular one that is designed identically to the first gear unit, with the second sub-axle. Between the connecting shafts and the respective sub-axle are thus provided the gear units. These gear units can be equipped for example with a gear wheel stage, in particular a bevel gear stage. At the same time, different gear units can be provided for the first sub-axle and for the second sub-axle. However, it is particularly advantageous when the second gear unit is designed identically to the second sub-axle with the first gear unit of the first sub-axle in order to have a smaller number of different parts in this respect.

In addition, it is also possible to arrange the first and the second connecting shaft so that they are coaxial or offset in parallel to one another. The former is in particular the case when the first connecting shaft is directly connected with an operational connection to the coupling gear sun wheel, and the latter when it is directly operatively connected to the coupling gear planetary carrier, which is to say for example without an intermediate gear wheel stage. The coaxial arrangement of both connecting shafts makes it possible to create the most space-saving design of the transmission design. The design displaced in parallel to each other is in particular provided when for example the operational connection of the first connecting shaft is realized through the gear wheel stage or a clutch maintaining the direction of the rotations.

BRIEF DESCRIPTION OF THE DRAWINGS

The invention will now be explained in more detail based embodiments with reference to the attached figures, without limiting the invention. The figures show the following.

DETAILED DESCRIPTION OF THE DRAWINGS

Figure 1:
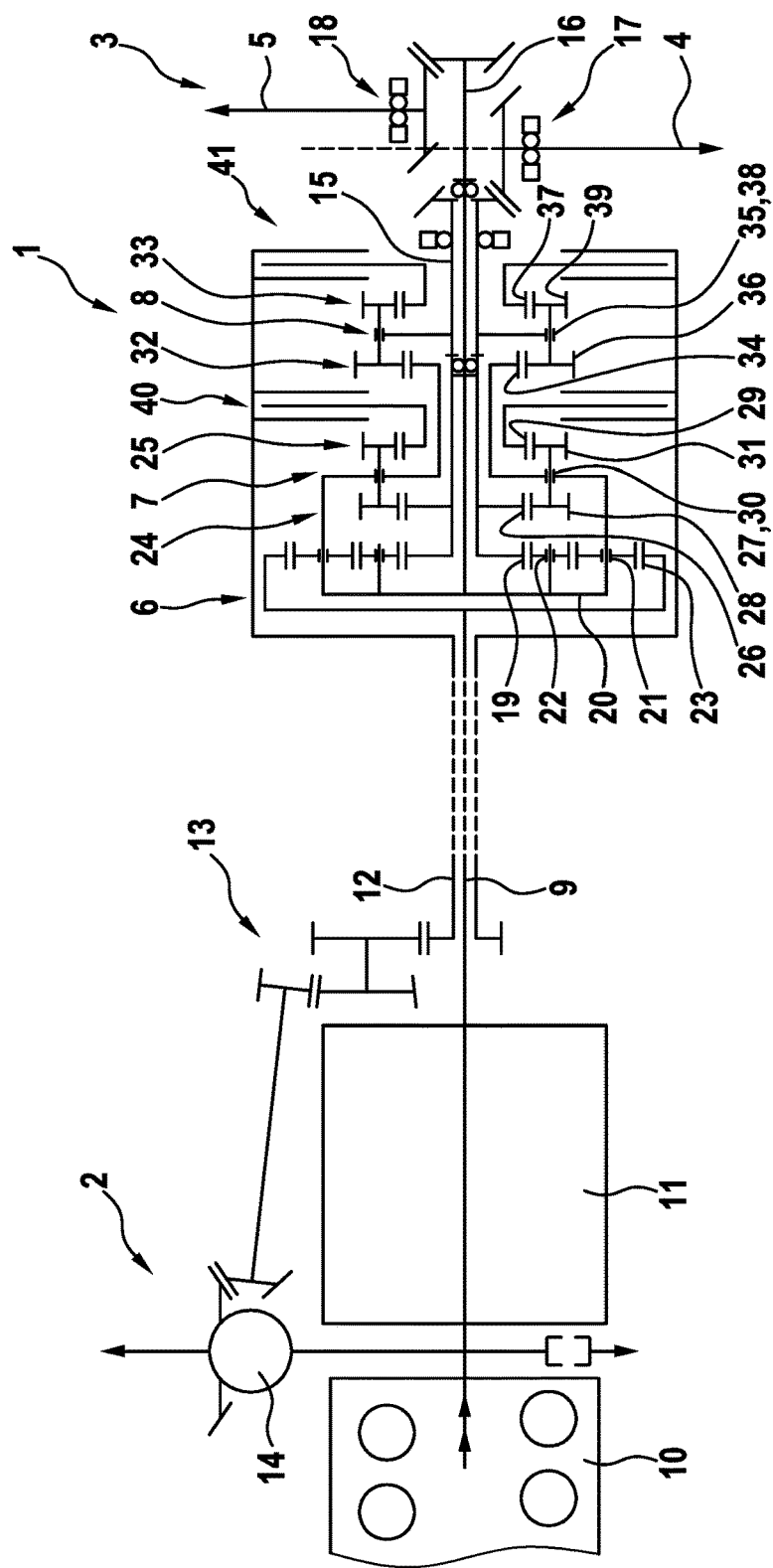
FIG. 1 a transmission device for a motor vehicle in a first embodiment.

FIG. 1 shows an embodiment of a transmission device 1 for a motor vehicle, which is here indicated only schematically. The motor vehicle is equipped with a first wheel axle 2 and with a second wheel axle 3, which are again merely indicated here, wherein the second wheel axle 3 comprises at least a first sub-axle 4 and a second sub-axle 5. The transmission device 1, the first wheel axle 2 and the second wheel axle 3 thus form at least one part of a drive train of the motor vehicle. The transmission device 1 is equipped with a coupling gearbox 6, a first superposition gearbox 7 and a second superposition gearbox 8. The coupling gearbox 1 is provided with a drive shaft 9, which is operatively connected with a drive unit 10, for example via a shift transmission 11.

Furthermore, the coupling gearbox 6 is provided with an output shaft 12, to which is connected the first wheel axle 2, for example via at least one gearwheel stage 13 and/or an axle differential 14. An operational connection to the second wheel axle 5 or to its associated first sub-axle 4 and to the second sub-axle 5 runs through a first connecting shaft 15 and a second connecting shaft 16. The first connecting shaft 15 is operatively connected via a second drive unit 17, which is provided for example as a gearwheel stage, with the first sub-axle gear unit 17, which is provided for example as a gearwheel stage, with the first sub-axle 4 and the second connecting shaft 16 via a second drive unit 18, which is provided for example also as a gearwheel stage, creating an operational connection with the second sub-axle 5.

The coupling gearbox 6 is designed as a planetary gear and it is equipped with a coupling gearbox sun wheel 19 and a coupling gearbox planetary carrier 20. On the coupling gearbox planetary carrier 20 are rotatably mounted at least an outer planetary gear wheel 21 and an inner planetary gear carrier 22. The inner planetary gear 22 now meshes with the coupling gearbox sun wheel 19 as well as with the outer planetary gear 21. The outer planetary wheel 21, on the other hand, meshes with the inner planetary gear 22 as well as with a coupling gear ring wheel 23, which is also assigned to the coupling gearbox 6. In the illustrated embodiment, the drive shaft 9 is rigidly and/or permanently connected with an operational connection to the gear ring wheel 23. The coupling gear planetary carrier 20 is on the other hand preferably rigidly and/or permanently connected with an operational connection to the second connecting shaft 16. The first connecting shaft 15 is preferably operatively connected rigidly and/or permanently with the coupling gear sun wheel 19.

The first super-position gear 7 comprises two planet gears, in particular a first primary gear 24 and a first secondary gear 25. The first primary gear 24 is provided with a first primary gear sun wheel 26 and with a first primary gear planetary carrier 27. At least a first primary gear planetary wheel 28 is rotatably mounted on it, which at the same time meshes with the first primary gear sun wheel 26. The first secondary gear 25 is provided with a first secondary gear sun wheel 29 and a first secondary gear planetary carrier 30, on which is rotatably mounted a first secondary gear planetary wheel 31. It is particularly preferred when the first primary gear planetary carrier 27 and the first secondary gear planetary carrier 30 are designed as joint planetary carriers. Furthermore, it is also preferred when the first primary gear planetary wheel 28 and the first secondary gear planetary wheel 31 are mutually non-rotatably connected, and in particular when they are rotatably mounted together in the first primary gear planetary carrier 27 or the first secondary gear planetary carrier 30.

The first primary gear planetary carrier 27 and the first secondary gear planetary carrier 30 are operatively connected with the coupling gear planetary carrier 20, in particular rigidly and/or permanently. The first primary gear planetary wheel 28 and the second gear planetary wheel 31 can have the same rotational axis as the inner planetary wheel 22. For example, the same transmission ratio is provided between the coupling gear sun wheel 19 and the inner planetary wheel 22 as between the first primary gear sun wheel 26 and the first primary gear planetary wheel 28. However, it is preferred when the transmission ratios are mutually different.

The transmission ratio between the first secondary gear sun wheel 29 and the first secondary gear planetary wheel 31 can be different from this transmission ratio or from these transmission ratios.

The second superposition gear 8 is also provided with the second primary gear 32 and the second secondary gear 33. The second primary gear is provided with the second primary gear wheel 34 and the second primary planetary wheel 35, on which is rotatably mounted at least one second primary gear planetary gear 36. The second secondary gear 33 is provided with a second secondary gear sun wheel 37 and a second secondary gear planetary carrier 38, on which is rotatably mounted at least one second secondary gear planetary wheel 39. In particular, the second primary gear planetary carrier 35 and the second secondary gear planetary carrier 38 are designed as joint planetary carriers. On the latter are rotatably mounted the second primary gear planetary wheel 36 and the second secondary gear planetary wheel 39. It is preferred when the second primary gear planetary wheel 36 and the second secondary gear planetary wheel 39 are mutually connected in a non-rotatable manner.

The second primary gear sun wheel 34 is operatively connected with the primary gear planetary carrier 27 and/or the first secondary gear planetary carrier 30, in particular rigidly and permanently. The second primary gear planetary carrier 35 and the second secondary planetary gear 38 are also operatively connected to each other, they are preferably designed as joint planetary carriers. The second primary gear planetary wheel 36 meshes with the second primary gear sun wheel 34. Analogously, the second secondary gear planetary wheel 39 meshes with the second secondary gear sun wheel 37. The second primary gear planetary carrier 35 and/or the second secondary gear planetary carrier 38 are operatively connected with the first connecting shaft, in particular rigidly and permanently.

The transmission device 1 is further provided with a first clutch 40 and with a second clutch 41. By means of the first clutch 40, the output shaft 12 can be operatively connected with the first secondary gear sun wheel 29. This means that with a closed clutch, the second output shaft 12 is fixed with respect to the first secondary gear sun wheel 29. Analogously, the second clutch 41 is used to establish an operative connection between the output shaft 12 and the secondary gear sun wheel 37. Also in this case, with a closed clutch 41, the output shaft 12 is fixed with respect to the secondary gear sun wheel 37. A "torque vectoring" can thus be achieved with targeted, at least partial opening or closing of the clutches 40 and 41 between the first wheel axle 2 and the second wheel axle 3. In particular, the torque can be transmitted from one of the sub-axles 4 and 5, but also from both sub-axles 4 and 5, to the first wheel axle 2.

Figure 2:
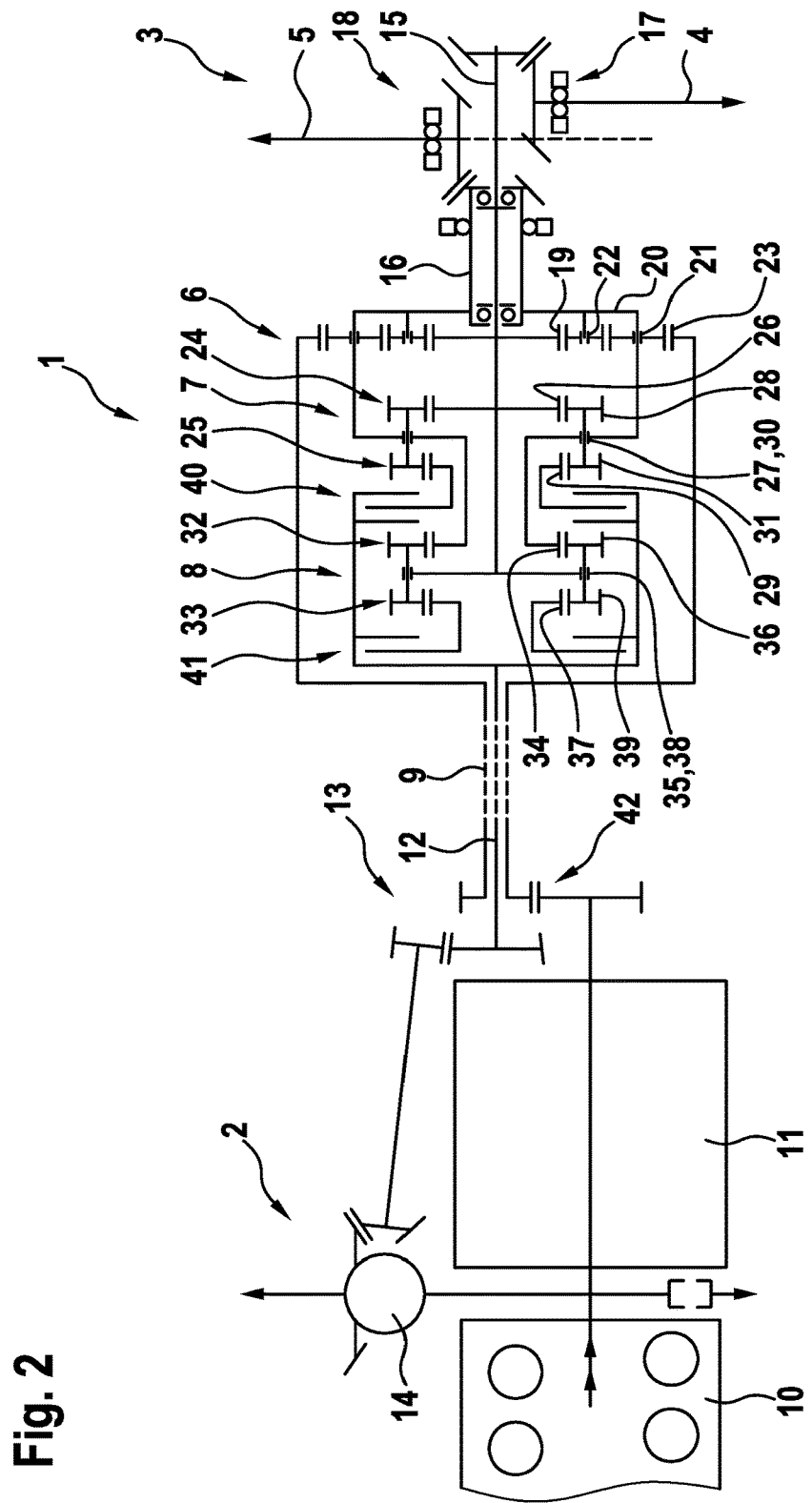
FIG. 2 the transmission device in a second embodiment.

FIG. 2 shows a second embodiment of the transmission device 1. In principle, reference is made to the preceding embodiments so that only differences will be discussed below. The essential difference is that the direction of rotations of the transmission device is reversed when compared to that of the embodiments described above. For this reason, a gear wheel stage 42 is deployed between the input shaft 9 and the input unit 10. Therefore, the second connecting shaft 16 now surrounds at least partially the first connecting shaft 15, wherein the connecting shafts 15 and 16 are arranged coaxially to each other. On the other hand, in the first embodiment described above, the first connecting shaft 15 was at least partially surrounding the second connecting shaft 16.

Figure 3:
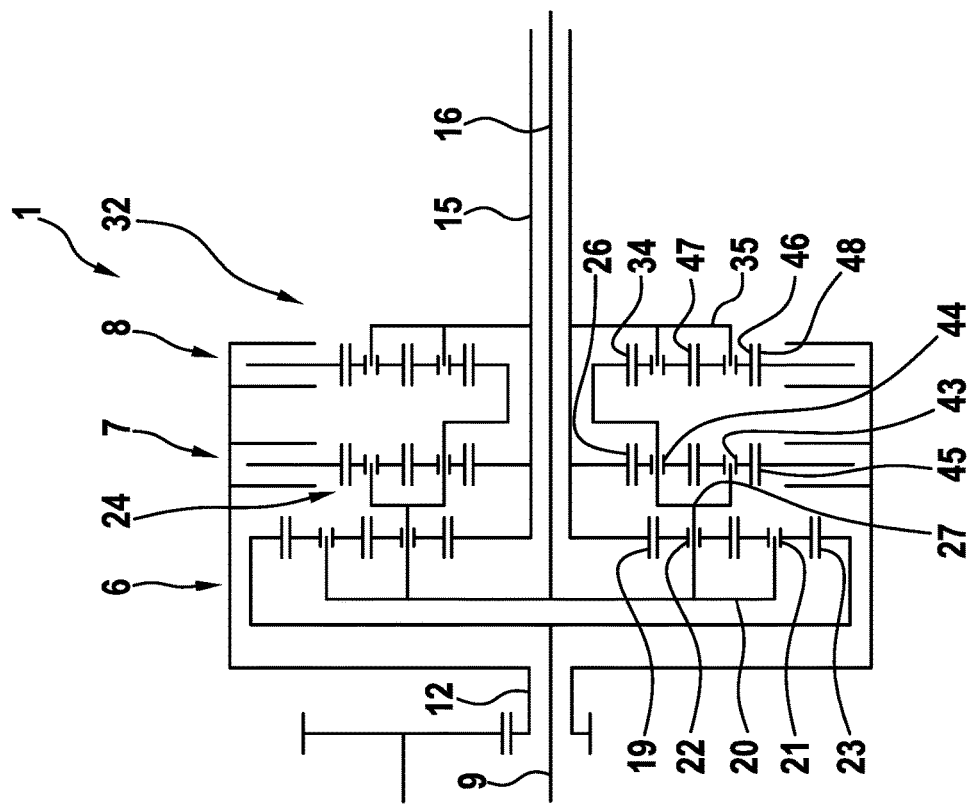
FIG. 3 the transmission device in a third embodiment.

FIG. 3 shows a detailed illustration of a third embodiment of the transmission device 1. Reference is hereby made to the preceding embodiments. Here, the first superposition gear 7 is provided only with the first primary gear 24 and the second superposition gear 8 is provided only with the second primary gear 32. However, instead of the first primary gear sun wheel 26, an outer planetary wheel 43 and an inner planetary wheel 44 are provided, which are meshing with one another. The output planetary wheel 43 meshes at the same time with a gear ring wheel 45, and the inner planetary wheel 44 with the first primary gear sun wheel 26.

The second superposition 8 is equipped with the second primary gear 32. On the second primary gear planetary carrier 35 are also provided an outer planetary wheel 46 and an inner planetary wheel 47. The inner planetary wheel 47 meshes with the second primary gear sun wheel 36, and the outer planetary wheel 46 with a gear ring wheel 48. The gear ring wheel 45 can thus be fixed by means of the first clutch 40 with respect to the output shaft 12, and the gear ring wheel by means of the second clutch 41. Accordingly, the same functionality can be achieved with the embodiment of the transmission 1 indicated here as in the embodiments described above.

The invention claimed is:

1. A gearbox unit for a motor vehicle, the motor vehicle comprising a first wheel axle and a second wheel axle, the second wheel axle comprising at least one first sub-axle and one second sub-axle; the gearbox unit comprising:
   a connecting shaft, the connecting shaft configured to be operatively connected with a first sub-axle;
   a second connecting shaft, the second connecting shaft configured to be operatively connected with the second sub-axle and with a coupling gearbox;
   an input shaft, the input shaft configured to be operatively connected with an input shaft of the motor vehicle;
   an output shaft, the output shaft configured to be operatively connected with the first wheel axle;
   wherein the input shaft is connected with the first and second connection shaft through the coupling gearbox;
   wherein the first connecting shaft and the second connecting shaft are respectively directly connected to the coupling gearbox;
   wherein the output shaft is configured to be operatively connected, in a switchable manner, to the first connecting shaft by a first clutch;
   wherein the output shaft is configured to be operatively connected, in a switchable manner, to the second connecting shaft by a second clutch;
   wherein between the first clutch and the first connecting shaft is provided a first superposition gear, and between the second clutch and the second connecting shaft is provided a second superposition gear; and
   wherein the first superposition gear is a planetary gear that is directly connected with an operational connection to a clutch gear.

2. The gearbox unit of claim 1, wherein the output shaft is configured to be operatively connected via the first clutch with the first superposition gear and via the second clutch to the second superposition gear.

3. The gearbox unit according to claim 1, wherein the coupling gearbox comprises a coupling gear sun wheel;
   wherein the gearbox unit further comprises a coupling gear ring wheel and a coupling gear planetary carrier including a coupling gear planetary wheel, the coupling gear planetary wheel configured to mesh with at least the coupling gear sun wheel and the coupling gear right wheel; and
   wherein the coupling gear ring wheel is directly connected with the input shaft in an operational manner.

4. The gearbox unit according to claim 2, wherein the coupling gearbox comprises a coupling gear sun wheel;
   wherein the gearbox unit further comprises a coupling gear ring wheel and a coupling gear planetary carrier including a coupling gear planetary wheel, the coupling gear planetary wheel configured to mesh with at least the coupling gear sun wheel and the coupling gear right wheel; and
   wherein the coupling gear ring wheel is directly connected with the input shaft in an operational manner.

5. The gearbox unit according to claim 3, wherein the coupling gear planetary carrier is directly connected in an operational manner with one of the first connecting shaft and the second connecting shaft, and wherein the coupling gear sun wheel is directly connected in an operational manner with the other of the first connecting shaft and the second connecting shaft.

6. The gearbox unit according to claim 3, wherein the coupling gear planetary carrier is provided with at least one outer planetary wheel and at least one inner planetary wheel, the at least one outer planetary wheel and the at least one inner planetary wheel configured to mesh with one another;
   wherein the outer planetary wheel is configured to mesh with the coupling gear ring wheel and the inner planetary wheel is configured to mesh with the coupling gear sun wheel.

7. The gearbox unit according to claim 5, wherein the coupling gear planetary carrier is provided with at least one outer planetary wheel and at least one inner planetary wheel, the at least one outer planetary wheel and the at least one inner planetary wheel configured to mesh with one another;
   wherein the outer planetary wheel is configured to mesh with the coupling gear ring wheel and the inner planetary wheel is configured to mesh with the coupling gear sun wheel.

8. The gearbox unit according to claim 3, wherein the first superposition gear is equipped with a first primary gear and a first secondary gear;
   wherein the first primary gear is provided with a primary gear sun wheel, a first primary gear planetary carrier, and a primary gear planet gear, the primary gear planet gear configured to mesh with at least the primary gear sun wheel;
   wherein the first primary gear sun wheel is configured to be directly connected with an operational connection with the first connecting shaft; and
   wherein the first primary planetary carrier is configured to be directly connected with an operational connected with the coupling gear planetary carrier.

9. The gearbox unit according to claim 5, wherein the first superposition gear is equipped with a first primary gear and a first secondary gear;
   wherein the first primary gear is provided with a primary gear sun wheel, a first primary gear planetary carrier, and a primary gear planet gear, the primary gear planet gear configured to mesh with at least the primary gear sun wheel;
   wherein the first primary gear sun wheel is configured to be directly connected with an operational connection with the first connecting shaft; and
   wherein the first primary planetary carrier is configured to be directly connected with an operational connected with the coupling gear planetary carrier.

10. The gearbox unit according to claim 6, wherein the first superposition gear is equipped with a first primary gear and a first secondary gear;
    wherein the first primary gear is provided with a primary gear sun wheel, a first primary gear planetary carrier, and a primary gear planet gear, the primary gear planet gear configured to mesh with at least the primary gear sun wheel;
    wherein the first primary gear sun wheel is configured to be directly connected with an operational connection with the first connecting shaft; and
    wherein the first primary planetary carrier is configured to be directly connected with an operational connected with the coupling gear planetary carrier.

11. The gearbox unit according to claim 8, wherein the first secondary gear is equipped with a first secondary gear sun wheel, a first secondary gear planetary carrier, and a first secondary gear planetary wheel, the first secondary gear planetary wheel meshing with at least the first secondary gear sun wheel;
    wherein the first secondary gear sun wheel is configured to be fixed with respect to the output shaft, by the first clutch, at least partially; and
    wherein the first secondary gear planetary carrier is configured to be connected with an operational connection with the coupling gear planetary carrier.

12. The gearbox unit according to claim 11, wherein the first secondary gear sun wheel is configured to be fully fixed with respect to the output shaft by the first clutch.

13. The gearbox unit according to claim 3, wherein the second superposition gear is equipped with a second primary gear and a second secondary gear;
    wherein the second primary gear is provided with a second primary gear sun wheel and a second primary gear planetary carrier having a second primary gear planetary wheel, the second primary gear planetary wheel configured to mesh with at least the second primary gear sun wheel;
    wherein the second primary gear sun wheel is directly connected with an operational connection with the coupling gear planetary carrier; and
    wherein the second primary gear planetary carrier is directly connected with an operational connection with the first connecting shaft.

14. The gearbox unit according to claim 5, wherein the second superposition gear is equipped with a second primary gear and a second secondary gear;
    wherein the second primary gear is provided with a second primary gear sun wheel and a second primary gear planetary carrier having a second primary gear planetary wheel, the second primary gear planetary wheel configured to mesh with at least the second primary gear sun wheel;
    wherein the second primary gear sun wheel is directly connected with an operational connection with the coupling gear planetary carrier; and
    wherein the second primary gear planetary carrier is directly connected with an operational connection with the first connecting shaft.

15. The gearbox unit according to claim 6, wherein the second superposition gear is equipped with a second primary gear and a second secondary gear;
    wherein the second primary gear is provided with a second primary gear sun wheel and a second primary gear planetary carrier having a second primary gear planetary wheel, the second primary gear planetary wheel configured to mesh with at least the second primary gear sun wheel;
    wherein the second primary gear sun wheel is directly connected with an operational connection with the coupling gear planetary carrier; and
    wherein the second primary gear planetary carrier is directly connected with an operational connection with the first connecting shaft.

16. The gearbox unit according to claim 8, wherein the second superposition gear is equipped with a second primary gear and a second secondary gear;
    wherein the second primary gear is provided with a second primary gear sun wheel and a second primary gear planetary carrier having a second primary gear planetary wheel, the second primary gear planetary wheel configured to mesh with at least the second primary gear sun wheel;
    wherein the second primary gear sun wheel is directly connected with an operational connection with the coupling gear planetary carrier; and
    wherein the second primary gear planetary carrier is directly connected with an operational connection with the first connecting shaft.

17. The gearbox unit according to claim 11, wherein the second superposition gear is equipped with a second primary gear and a second secondary gear;
    wherein the second primary gear is provided with a second primary gear sun wheel and a second primary gear planetary carrier having a second primary gear planetary wheel, the second primary gear planetary wheel configured to mesh with at least the second primary gear sun wheel;
    wherein the second primary gear sun wheel is directly connected with an operational connection with the coupling gear planetary carrier; and
    wherein the second primary gear planetary carrier is directly connected with an operational connection with the first connecting shaft.

18. The gearbox unit according to claim 13, wherein the second secondary gear is equipped with a second secondary gear sun wheel, a second secondary gear planetary carrier, and a second secondary gear planetary wheel, the second secondary gear planetary wheel configured to mesh with at least the second secondary gear wheel;
   wherein the second secondary gear sun wheel is configured to be fixed with respect to the output shaft, by a second clutch, at least partially; and
   wherein the second secondary gear planetary carrier is configured to be directly connected with an operational connection to the second primary gear carrier.

19. The gearbox unit according to claim 18, wherein the second secondary gear sun wheel is configured to be fully fixed with respect to the output shaft by the second clutch.

\* \* \* \* \*